United States Patent
Raynor et al.

(10) Patent No.: US 10,461,858 B2
(45) Date of Patent: Oct. 29, 2019

(54) VEHICLE COMMUNICATIONS USING VISIBLE LIGHT COMMUNICATIONS

(71) Applicant: STMICROELECTRONICS (RESEARCH & DEVELOPMENT) LIMITED, Marlow (GB)

(72) Inventors: Jeffrey M. Raynor, Edinburgh (GB); Duncan Hall, Edinburgh (GB)

(73) Assignee: STMicroelectronics (Research & Development) Limited, Marlow, Bucks (GB)

(*) Notice: Subject to any disclaimer, the term of this patent is extended or adjusted under 35 U.S.C. 154(b) by 0 days.

(21) Appl. No.: 15/892,035

(22) Filed: Feb. 8, 2018

(65) Prior Publication Data

US 2018/0359031 A1 Dec. 13, 2018

(30) Foreign Application Priority Data

Jun. 12, 2017 (EP) ..................................... 17175551

(51) Int. Cl.
*H04B 10/116* (2013.01)
*H04W 4/46* (2018.01)
*G08G 1/16* (2006.01)
*G06T 7/70* (2017.01)

(52) U.S. Cl.
CPC .............. *H04B 10/116* (2013.01); *G06T 7/70* (2017.01); *G08G 1/162* (2013.01); *H04W 4/46* (2018.02); *G06T 2207/10048* (2013.01); *G06T 2207/30236* (2013.01); *G06T 2207/30244* (2013.01)

(58) Field of Classification Search
CPC .............. H04B 10/116; H04B 10/0795; H04N 5/23229
See application file for complete search history.

(56) References Cited

U.S. PATENT DOCUMENTS

| | | | |
|---|---|---|---|
| 9,014,564 B2 | 4/2015 | Roberts et al. | |
| 10,063,796 B2 | 8/2018 | Lule et al. | |
| 2004/0161246 A1* | 8/2004 | Matsushita | G06F 3/002 398/187 |
| 2012/0116632 A1* | 5/2012 | Bechtel | B60Q 1/1423 701/36 |
| 2013/0272717 A1 | 10/2013 | Deguchi et al. | |
| 2014/0236414 A1* | 8/2014 | Droz | G08G 1/161 701/28 |
| 2014/0347648 A1 | 11/2014 | Roberts | |
| 2016/0003946 A1* | 1/2016 | Gilliland | G01S 17/10 356/5.01 |
| 2016/0182820 A1* | 6/2016 | Borthakur | H04N 5/23229 348/207.1 |
| 2016/0323035 A1* | 11/2016 | Jovicic | H04B 10/0795 |
| 2017/0244482 A1* | 8/2017 | Dimare | H04B 10/116 |

FOREIGN PATENT DOCUMENTS

WO  2013016439 A1  1/2013

* cited by examiner

*Primary Examiner* — Dzung D Tran
(74) *Attorney, Agent, or Firm* — Slater Matsil, LLP (57) ABSTRACT

An apparatus has a pixel array arrangement having a number of photosensitive detectors. Processing circuitry is configured to process data captured by at least one pixel of the array to provide image information and detect data on an encoded pulsed light signal. In a specific embodiment, data is captured at a vehicle. Information for the vehicle is determined based on the encoded pulsed light signal.

26 Claims, 7 Drawing Sheets

VEHICLE COMMUNICATIONS USING VISIBLE LIGHT COMMUNICATIONS

CROSS-REFERENCE TO RELATED APPLICATIONS

This application claims priority to European Patent Application No. 17175551.5, filed on Jun. 12, 2017, which application is hereby incorporated herein by reference.

TECHNICAL FIELD

Some embodiments relate to an apparatus and method and in particular but not exclusively to an apparatus and method that use visible light communication.

BACKGROUND

The trend is for more cars and other vehicles to have more driver assist features, moving ultimately to self-driving vehicles. This may provide increased safety for vehicle occupants, pedestrians and cyclists.

SUMMARY

According to an aspect, there is provided an apparatus comprising a pixel array arrangement having a plurality of photosensitive detectors. Processing circuitry is configured to process data captured by at least one pixel of the array to provide image information and to detect data on an encoded pulsed light signal.

The pixel array arrangement may comprise a first part that is configured to provide image data to the processing circuitry and a second part that is configured to detect the encoded pulsed light signal.

The apparatus may be configured to capture the image data for n frames and the encoded pulsed light signal for m frames, where n and m are integers.

The processing circuitry may be configured to determine when a pulsed encoded light signal is present and when the pulsed encoded light signal is present to cause the value of m to be increased.

The pixel arrangement may be configured to capture the data providing the image information at different times to the data on the encoded pulsed light signal.

The processing circuitry may be configured to use the image information to locate a position of a source of the encoded pulsed light signal.

A timing associated with a respective pixel in the pixel array arrangement controls if the respective pixel is configured to detect image data or data on the encoded light pulse.

The processing circuitry may be configured to provide an output to an automotive driving system.

Each value of data on the encoded light pulse may be represented by a plurality of bit values.

The data may be encoded on the pulsed light signal using Manchester encoding.

At least one pixel may comprise a plurality of photodetectors, one for each of the plurality of bit values.

At least one pixel may comprise one photodetector controlled to detect each of the plurality of bit values.

The pulsed light signal may be at a frequency such that a pulsing of the light signal is not detected by the human eye.

According to another aspect, there is provided an automotive driving system comprising an apparatus such as described above.

According to another aspect, a method comprises processing data captured by at least one pixel of a pixel array arrangement having a plurality of photosensitive detectors to provide image information and to detect data on an encoded pulsed light signal.

The method may comprise using a first part of the pixel array arrangement to provide image data and a second part of the pixel array arrangement to detect the encoded pulsed light signal.

The method may comprise capturing the image data for n frames and the encoded pulsed light signal for m frames, where n and m are integers.

The method may comprise determining when a pulsed encoded light signal is present and when the pulsed encoded light signal is present causing the value of m to be increased.

The method may comprise capturing the data providing the image information at different times to the data on the encoded pulsed light signal.

The method may comprise using the image information to locate a position of a source of the encoded pulsed light signal.

The method may comprise controlling a timing associated with a respective pixel in the pixel array arrangement such that the respective pixel is configured to detect image data or data on the encoded light pulse.

The method may comprise providing an output to an automotive driving system.

The data may be encoded on the pulsed light signal using Manchester encoding.

The pulsed light signal may be at a frequency such that a pulsing of the light signal is not detected by the human eye.

BRIEF DESCRIPTION OF THE DRAWINGS

Some embodiments will now be described by way of example only and with reference to the accompanying figures in which.

DETAILED DESCRIPTION OF ILLUSTRATIVE EMBODIMENTS

Some embodiments may provide a communication path between vehicles and/or between street signs and vehicles.

Communications between vehicles may be able to, for example, reduce congestion and/or improve safety. Vehicles may able to travel closer together and communicate so that if the front vehicle needs to brake, the time of applying the brake and/or the deceleration rate may be communicated from the vehicle at the front of following vehicles so that they can all apply the brake and decelerate generally at the same time.

Conversely, acceleration information may be communicated so that vehicles can speed up generally at the same time.

Some embodiments may provide a reliable communication path between stationary objects, such as traffic lights, speed restriction signs, congestion warning signs etc. and vehicles.

This may permit dynamic control of the traffic, such as variable speed limits to reduce congestion or a temporary lower speed in case of road works or an accident.

The communication, which are received and/or transmitted by a vehicle or stationary object, may be used to provide a control function and/or be used to provide information.

Fixed signs are well known and have been used for many decades. It is common for signs to be un-changed for a long period of time. Some systems have been proposed which enable imaging systems to capture an image of the sign to determine its content, e.g. a speed limit or a warning. However, these imaging systems can be unreliable, for example if the sign is partially obscured, in difficult lighting situation and in bad weather conditions. This can lead to the failure of, for example, OCR (optical character recognition).

Radio frequency communications (e.g. between 10 MHz and 10 GHz) can be used to communicate information between vehicles or between stationary objects and vehicles. However, there is much congestion in the airwaves and many frequency bands have been allocated to many different applications and so only narrow bandwidth may be available. With this narrow bandwidth, it may be difficult to avoid clashes between many different transmitters. One option may be to improve spectrum usage efficiency by using narrow beams to communicate. However this might require a relatively large, directional antenna which may not be aerodynamic.

Some embodiments may thus provide provides a communication path between vehicles or between street signs and vehicles which addresses one or more of the previously discussed issues.

Many traffic illumination sources are now LED (light emitting diode) based. For example one or more of traffic lights, street signs, street illumination, vehicle brake lights, vehicle headlights and/or the like may use LEDs, lasers, for example vertical cavity surface emitting lasers (VSCELs, organic LEDs (OLEDs), phosphors or any other suitable light source. In some embodiments, these LEDs or other light source are configured to pulse at a rate that is not visible to humans but carry useful information to the receiver of the information which may be vehicles or the sign or the like. In some embodiments, the LEDs in signs may be configured to convey information via the pulsing of the LEDs. Alternatively or additionally, vehicle lights may pulse to convey information. The vehicle lights may comprise one or more of headlights, rear lights, brake lights or the like.

It should be appreciated that a detector is provided to detect the information encoded on these pulses.

Figure 1:
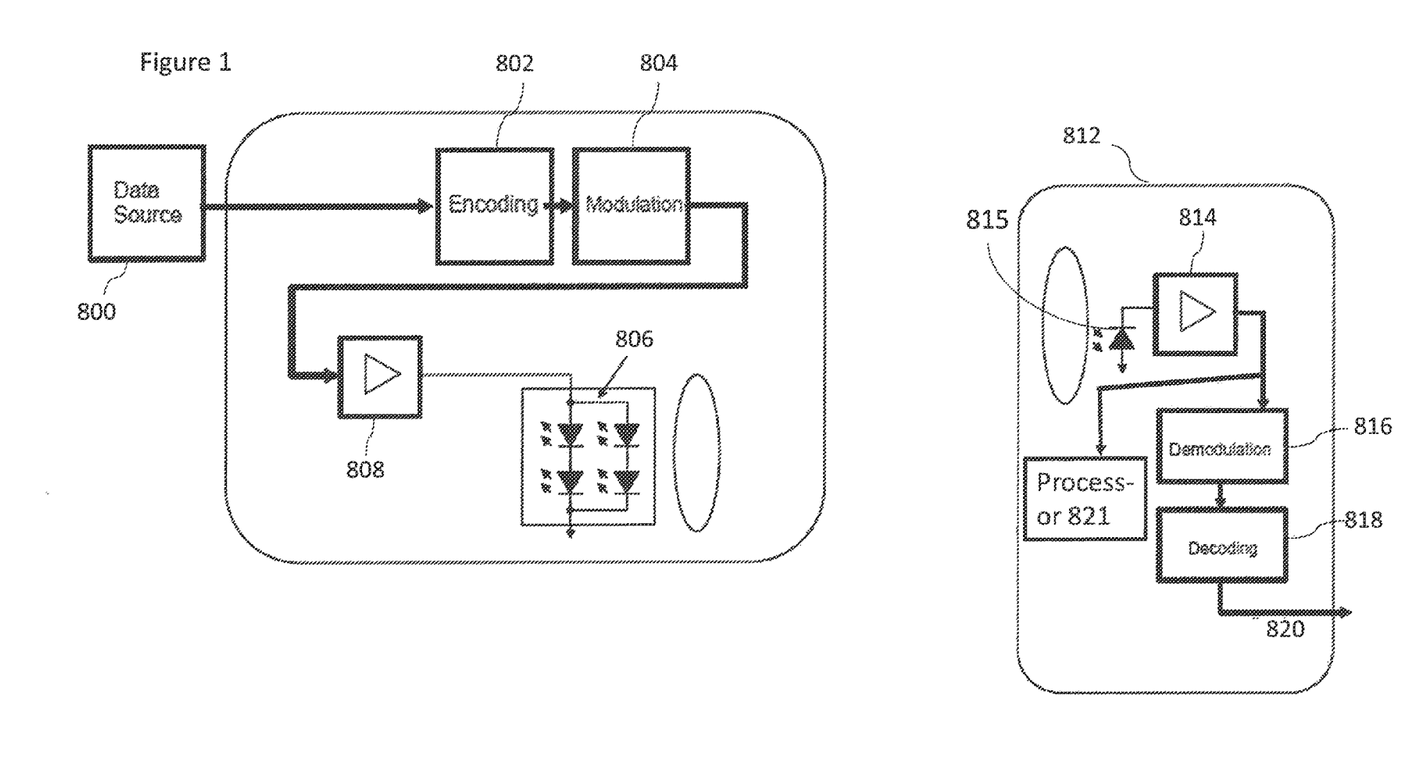
FIG. 1 shows a schematic view of a first receiver/transmitter system.

Reference is made to FIG. 1 which schematically shows a first embodiment. In FIG. 1, a transmitting part 810 is provided and a corresponding receiving part 812 is shown. In the context of the example of FIG. 1, the transmitting part and the receiving part may be provided on different entities. However, in practice, a given entity may have a transmitter and a receiver. The entity may for example be a vehicle. A vehicle may have a receiver and a transmitter. The entity may be a street sign, traffic light, street illumination or the like. It should be appreciated that where the entity is a street sign or the like, the entity may only have a transmitter. Other entities may only have a receiver.

The transmitting part 810 has a data source 800 which provides the data which is to be transmitted. The data source may be provided by at least one data store and/or at least one processor.

The data source 800 is arranged such that data is output to an encoder 802. Any suitable encoding scheme may be used. In some embodiments, the data is encoded using a scheme which facilitates the recovery of the carrier frequency and does not have any DC content. For example, the encoding scheme may be "Manchester encoding," eight-to-fourteen encoding or any other suitable scheme. The encoded data is provided by the encoder 802 to a modulator 804 to be modulated onto a carrier. Any suitable modulation scheme may be used such as phase shift keying, on-off keying, ODFM (orthogonal frequency division multiplex) and others.

The output of the modulator is provided to a buffer 808. The buffer provides an output to a bank of LEDs 806. The LEDs are thus controlled by the output of the modulator to provide a pulsed output which is used to convey the data. The LEDs are pulsed at a rate such that the pulsing is not visible to the human eye.

Reference is now made to the receiving part 812. The receiving part has a light detector 815. In some embodiments, the light detector may be a photodiode. The light detector may comprise a pixel arrangement such as described later.

The signal provided by the photodiode or one or more pixels of a pixel arrangement is provided to an amplifier 814 which amplifies the signal. The amplified signal is provided to a demodulator 816 which demodulates the signal. The demodulated signal is provided to a decoder which decodes the demodulated signal to thereby determine the transmitted data which is provided in an output 820. The demodulator and the decoder thus produce the carrier used to modulate the data and the data stream that was encoded. A processor 821 may also be provided. One or more of the demodulation and decoding functions may be provided and/or controlled by the processor. The processor may be configured to control the pixel arrangement. The processor may be provided by one or more processors.

The transmitting part may be provided in a street light, an illuminated sign (e.g. "STOP") or a matrix of illumination sources (e.g., driver information gantry) which all transmit the same data.

The data transmitted may be any suitable data such as the current speed limit, weather information ahead (e.g., fog ahead meaning down), traffic conditions ahead (traffic jam, so slow down) or other information.

The transmitting part may be in a vehicle's system. This transmitting part may transmit any suitable information such as one or more of the actual speed of the vehicle, the amount of acceleration (positive or negative (braking)) the vehicle will perform and at what time this will occur (now, in looms etc.), which lane the vehicle will be moving into, if the vehicle is staying in this lane, the destination of the vehicle, whether the vehicle is in self-driving, assisted or fully manual mode and/or other information which could be useful to neighboring vehicles.

Figure 2:
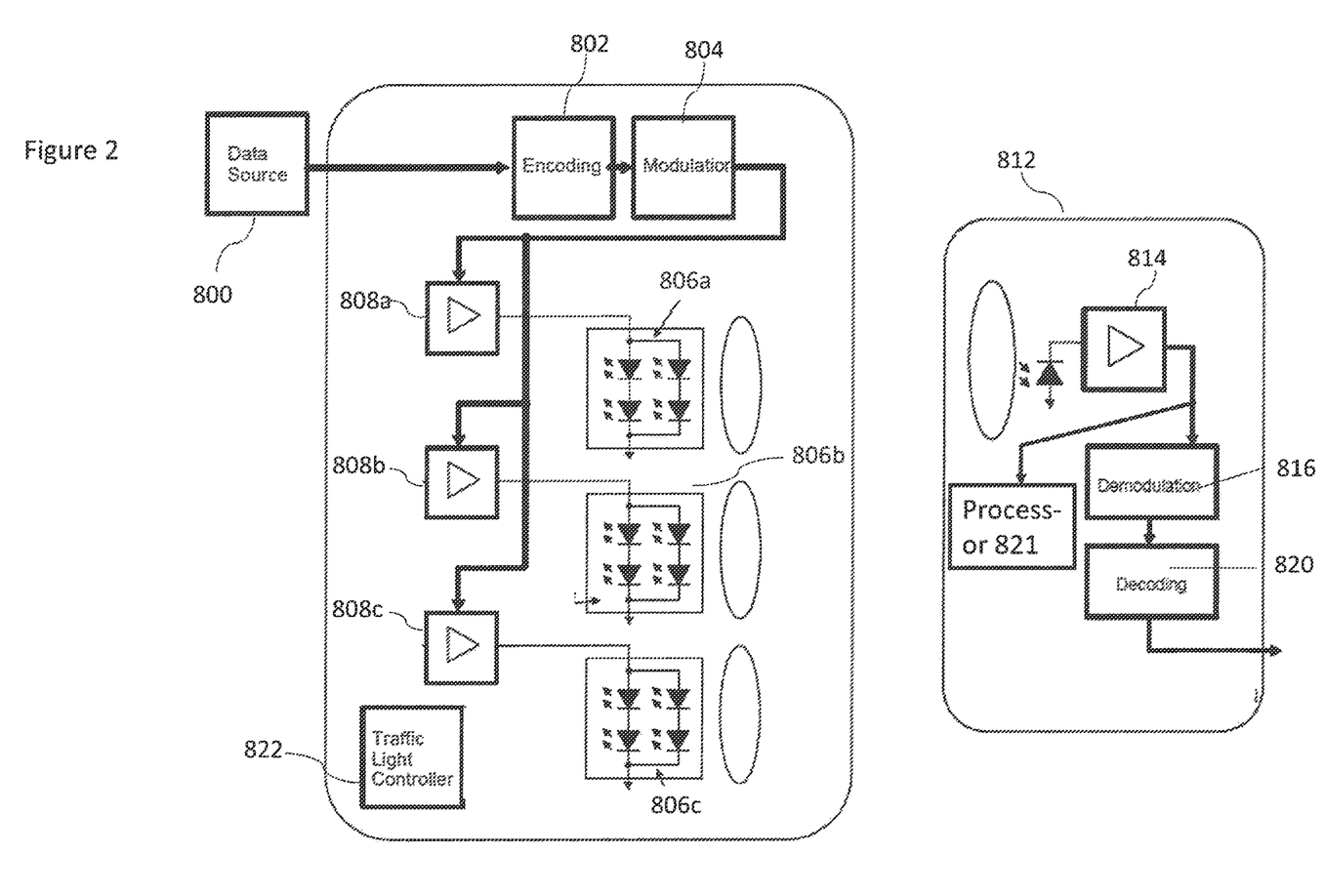
FIG. 2 shows a schematic view of a second receiver/transmitter system.

Reference is made to FIG. 2 which shows a transmitter part provided in a traffic light which has a bank of red LEDs 806a, a bank of amber LEDs 806b and a bank of green LEDs 806c. Each bank of LEDs is provided with a respective buffer 808a, 808b and 808c. In this example, each of the banks of LED is configured to carry the same data if on at the same time. Thus, in this example there is a same stream of data for all the traffic lights. Thus, the data source, encoder 802, and modulator 804 are as described in relation to FIG. 1. In this case, the output of the modulator is provided to each of the respective buffers 808a-808c. The data is transmitted by whichever of the bank of LEDs is on at a given time. As there is a single stream of data in this embodiment, the receiver part 812 is as described in relation to FIG. 1.

The receiver part may comprise any suitable detector. For example the receiver part may comprise a synchronous detector also known as a lock-in amplifier. There may be one or more constraints on such a visible light communications scheme used in some embodiments. For example, one or more of the following constraints may be provided in some embodiments:

(a) There should not be interference with the normal illumination (e.g. brake lights, traffic lights etc.).

(b) The eye should not perceive flicker in the light source. Hence the pulse frequency needs to be relatively high.

(c) The system should be robust and work in a wide range of ambient light levels. The presence of ambient light may decrease the available dynamic range of the sensor and may reduce the voltage swing available to detect the variations due to the communication signaling. This may result in a reduction in the bandwidth of the information channel.

Some embodiments may be more immune to various ambient lighting levels and/or increase the data bandwidth.

Some embodiments may take advantage of the spatial dimension in the communication system. For example, the system may employ multiple separate data transmitters and multiple separate data receivers. In this manner, the data rate may be increased. Optical communications may be suited for this method as it is practical to place an imaging optical system in front of the detector to get suitable spatial resolution. These lenses may be relatively low cost and produced on relatively small volumes as compared to equivalent RF techniques.

In some embodiments, multiple pixels are used. For example, in some embodiments, arrays of pixels may be used. In some embodiments, the pixel array may be relatively large, for example, having of the order of hundreds or thousands or millions of pixels.

In some embodiments, a camera having a suitable pixel array may be used. The camera may be used as a data receiver in some embodiments. In some embodiments, the camera may be arranged to also perform as a "camera" in order to monitor a scene. In some embodiments, the camera captures the image which is then processed to identify the position of an encoded data source. This may be used to determine which one or more of the pixels of the array may be switched off or put into a low power mode.

Figure 3:
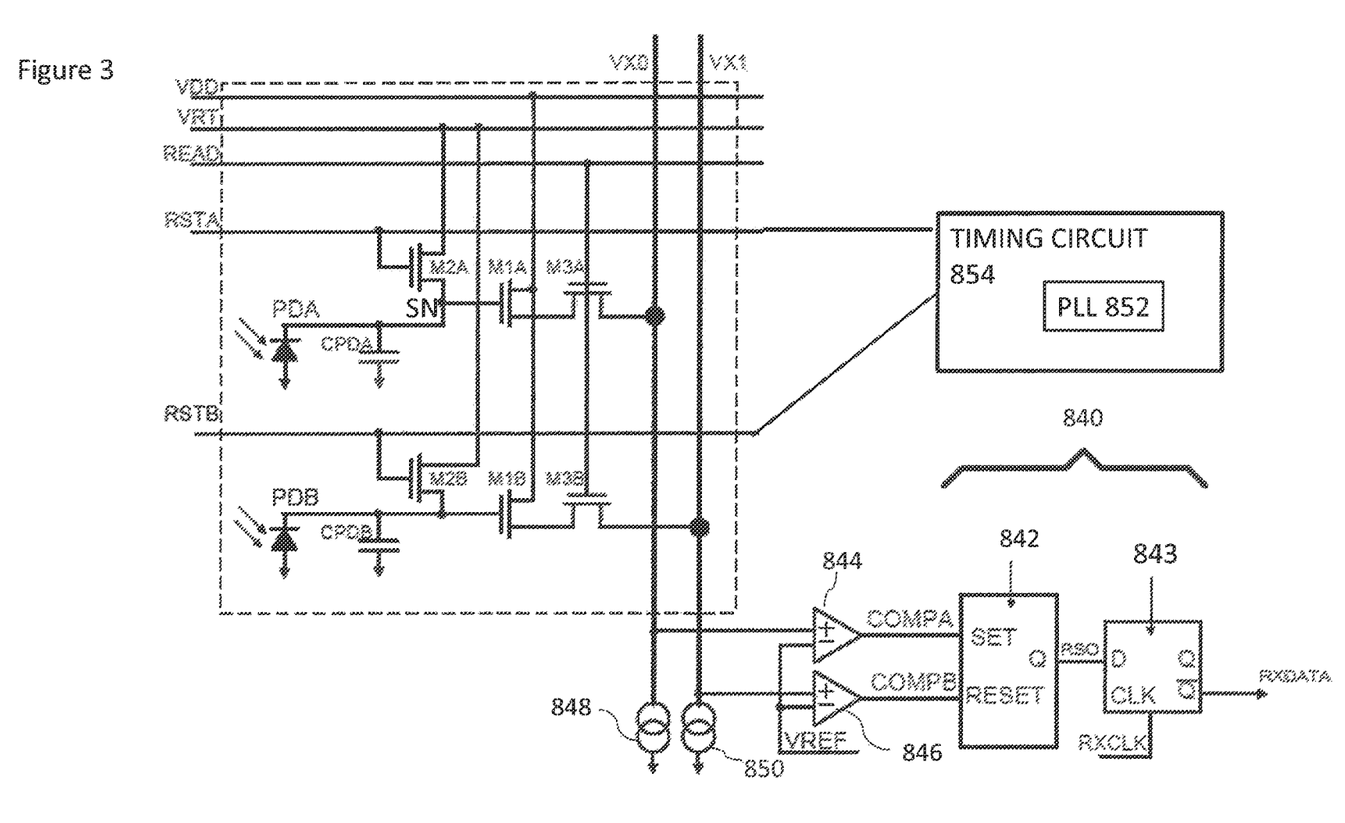
FIG. 3 shows a first receiver.

FIG. 3 shows the schematic of a sensor which uses multiple pixels. For clarity, only single pixel is shown in this figure.

The pixel arrangement of FIG. 3 comprises a first photodiode PDA and a second photodiode PDB. The first photodiode PDA is arranged to provide an output to a first sense node SM. A first source follower transistor M1A, a first reset transistor M2A and a first read transistor M3A are provided. These transistors act to reset, expose and then read out data from the first photodiode. The reset transistor M2A is controlled by a first reset signal RSTA and the first readout transistor M3A is controlled by a read signal READ. The first source follower transistor M1A has its gate tied to the first sense node SN1.

In more detail, the first reset transistor M2A receives the first reset signal RSTA at its gate, its drain is connected to a voltage VRT and its source is connected to the sense node SN. The first source follower transistor M1A has its drain connected to a supply voltage VDD and its source is connected to the drain of the first read transistor M3A. The read signal READ is coupled to the gate of the first read transistor M3A. The source of the read transistor M3A provides the output voltage VX0.

There is a first sample and hold capacitance CPDA. This may be a capacitance component and/or an intrinsic capacitance.

Similarly, the second photodiode PDB is arranged to provide an output to a second sense node SN2. A second source follower transistor M1B, a second reset transistor M2B and a second read transistor M3B are provided. These transistors are similarly connected as the corresponding transistors associated with the first photodiode. It should however be appreciated that the second reset transistor M2B receives a second reset signal RSTB at its gate and the source of the read transistor M3B provides the output voltage VX1.

There is a second sample and hold capacitance CPDB. This may be a capacitance component and/or an intrinsic capacitance.

The first and/or the second capacitance may be a separate component or may be the intrinsic capacitance of the photodiode.

In Manchester coding, a zero bit is represented by a period of low then a period of high and a one bit is represented by a period of high then a period of low (or vice versa). One bit may be provided every clock cycle. Thus pixel of FIG. 3 is arranged such that the first photodiode PDA captures the one value of the Manchester code, for example the first value of the code and the second photodiode PDB is arranged to capture the other value of the Manchester code, for example the second value of the code.

The output from line VXO (from the first photodiode PDA) is provided to a first comparator 844 along with a reference voltage value VREF. The output from line VX1 (from the second photodiode PDB) is provided to a second comparator 846 along with the reference voltage value VREF. The output COMPA of the first comparator 844 and the output COMPB of the second comparator 846 is provided to a latch 842. The output COMPA from the first comparator 844 is provided to the set input of the latch 842 and the output COMPB from the second comparator 846 is provided to the reset input of the latch 842. The Q output of the latch 842 is provided to D input of a D type flip flop 843. The receive clock RXCLK provides an input to the CLK input of the flip flop 843. The complementary output of the flip flop 843 provides the received data.

Figure 4:
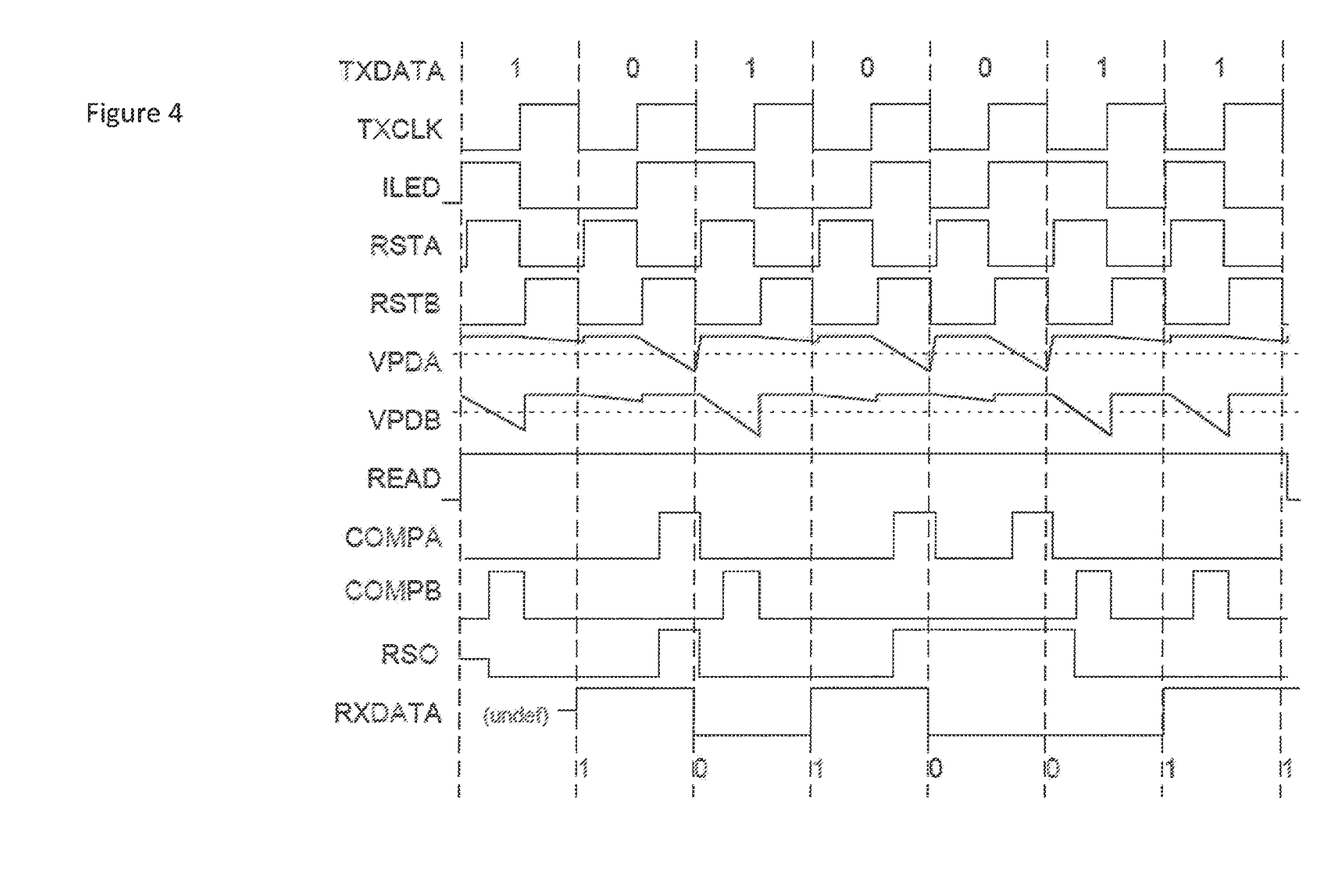
FIG. 4 shows a timing diagram for the first receiver.

Reference is made to FIG. 4 which shows the timing associated with the arrangement of FIG. 3 and which exemplifies the method of some embodiments.

The first row of the timing diagram shows the data which is being transmitted TXDATA. In this example, the transmitted data is 1010011.

The second row of the timing diagram shows the clock associated with the transmitted data. One bit is transmitted every clock signal.

The third row of the timing diagram shows the current ILED to the transmitting LEDS. High is a relatively large amount of current to the LED causing the LED to produce photons and low is a relatively low amount of current which causes the LEDs to stop producing light. If the data bit is 1, the current will be high then low in a clock cycle. If the data bit is 0, the current will be low then high in a clock cycle. This is for the example version of Manchester coding used. Of course the coding may be the other way round in other embodiments. The LEDs may be imaged onto the sensor using a lens. Hence multiple LEDs may be independently driven and the independent data received by separate pixels on the array.

The fourth row of the timing diagram shows the reset signal RSTA for the first photodiode PDA.

The fifth row of the timing diagram shows the reset signal RSTB for the second photodiode PDB.

The two photodetectors are reset with non-overlapping clock pulses (generated by the timing generator circuit 854). The timing generator circuit 854 uses the received data and a phase locked loop PLL 852 to generate reset pulses which are in phase with the clock used in the transmitter. As the RSTA and RSTB are of opposite phase, the two photodetectors collect charge at different times. RSTA is the inverse of the transmit clock and RSTB is the same as the transmit clock.

The sixth row of the timing diagram shows the voltage of the first photodiode VPDA.

The seventh row of the timing diagram shows the voltage of the second photodiode VPDB.

As can be seen on the VPDA and VPDB signals, if the LED is active when RSTA is active (high) then photodiode PDA will be reset (and not collecting photo-generated charge) and as RSTB is inactive (low) the photodiode PDB will not be reset and will be collecting photo-generated charge if ILED is high. This photo-generated charge causes the voltage on the photodiode to decay. Likewise if the LED is active when RSTA is inactive, then the first photodiode PDA will be collecting photo-generated charge. RSTB will be active and the second photodiode will be reset.

The eighth row of the timing diagram shows the read signal. The read signal is high to enable the reading of the data provided by the photodiodes.

The ninth row of the timing diagram shows the output COMPA of the first comparator 844.

The tenth row of the timing diagram shows the output COMPB of the second comparator 846.

The eleventh row of the timing diagram shows the output RSO of the latch.

The twelfth row of the timing diagram shows the received data RXDATA output by the flip flop.

Consider the case where a 1 is being transmitted. For the first part of the clock cycle, RSTA is high so the first photo diode is inactive and RSTB is low so the second photodiode is read out. The LED will be transmitting for the first part of the clock cycle so the low voltage on VX1 will pass lower than the threshold provided by the reference voltage VREF. This means that the output of the second comparator COMPB will go active. During the next part of the clock cycle, RSTA is low and RSTB is active and so photodiode PDA will collect photo-generated charge if the transmitting LED is transmitting. However, for a 1 the transmitting LED which is imaged onto this photo collector is not transmitting light for the second part of the clock cycle. Thus the voltage on first photodiode PDA will not decay much (there will be some dark current and so only a small delta V on the first photodiode PDA). The voltage on VXo will remain above the threshold provided by the reference voltage and so COMPA will remain low.

As COMPB has fired, the RS latch output RSO will be low and so this low signal will be clocked by the D-type flip-flop 843 and the complementary output Qbar will be high. This indicates that the transmitter sent a "bit 1" signal.

Consider the case where a 0 is being transmitted. For the first part of the clock cycle, RSTA is high so the first photo diode is inactive and RSTB is low so the second photodiode is read out. The LED will not be transmitting for the first part of the clock cycle so the voltage on VX1 will not pass lower than the threshold provided by the reference voltage VREF. This means that the output of the second comparator COMPB will not go active. During the next part of the clock cycle, RSTA is low and RSTB is active and so photodiode PDA will collect photo-generated charge as the transmitting LED is transmitting. The voltage on VXo will go below the threshold provided by the reference voltage and so COMPA will go active or high. As COMPA has fired, the RS latch output RSO will be high and so this high signal will be clocked by the D-type flip-flop 843 and the complementary output Qbar will be low. This indicates that the transmitter sent a "bit 0" signal.

The arrangement of FIG. 3 is arranged such that all the charge required to decide the logic level of the data is collected within a single integration period as when the respective RST pulse goes active, the respective photodiode will be charged to VRT and any charge (or more accurately, change of charge) in the photodiode will be lost. This may be advantageous in some situations.

Figure 5:
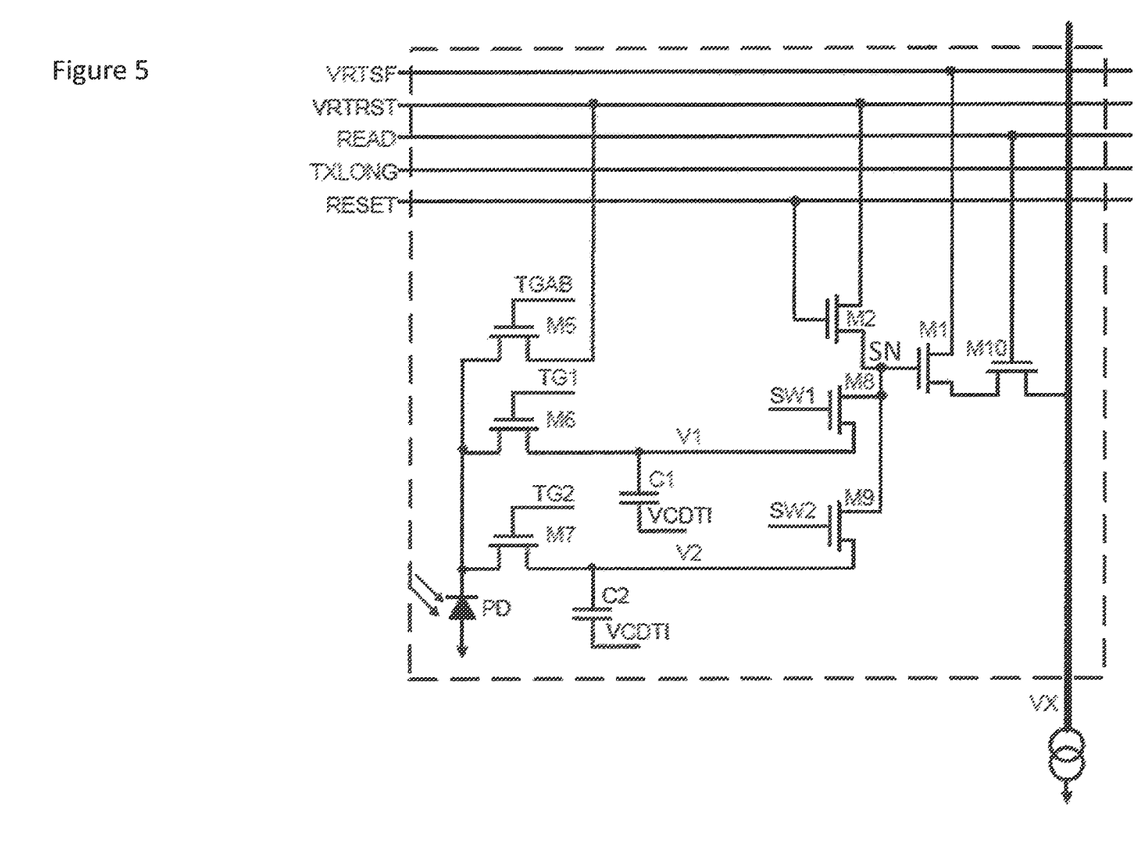
FIG. 5 shows a second receiver.

However in other scenarios, this may be less advantageous. As a relatively large number of electrons are required for an accurate reading (e.g., 1 k to 10 k) this implies either a large amount of light from the transmitting LED or a long integration period. In some situations, the amount of light is fixed and having a long integration period implies that the clock rate is low. A low clock rate may cause the LED to appear to flicker. In this regard, reference is made to FIG. 5 which shows another pixel according to another embodiment. In the arrangement of FIG. 5, there is a single photodiode as compared to the two photodiode pixel arrangement of FIG. 3. The single photodiode PD provides an output to three transfer gates M5, M6 and M7. The first transfer gate M7 is controlled by signal TG2, the second transfer gate M6 is controlled by signal TG1 and the third transfer gate M5 is controlled by signal TGAB. A source follower transistor M1, a reset transistor M2 and a read transistor M10 are provided. These transistors act to reset, expose and then read out data from the photodiode. The reset transistor M2 is controlled by a reset signal RESET and the readout transistor M10 is controlled by the read signal READ. The source follower transistor M1 has its gate tied to a sense node SN.

In more detail, the reset transistor M2 receives the reset signal RESET at its gate, its drain is connected to a voltage VRTSF and its source is connected to the sense node SN. The source follower transistor M1 has its drain connected to a source follower supply voltage VRTRST and its source is connected to the drain of the read transistor M10. The read signal READ is coupled to the gate of the read transistor M10. The source of the read transistor M10 provides the output voltage Vx. The drains of the first and second transfer gate transistors are connected to the source of a respective transistor M9 and M10. The sources of each of the three transfer gates are connected to the photodiode PD. In particular, transistor M9 is controlled by gate signal SW2 and transistor M8 is controlled by gate signal SW2. The drain of each of the transistors M8 and M9 is connected to the source node SN.

The drain of the third transfer gate transistor M5 is connected to the voltage VRTRST.

A first sample and hold capacitor C2 is provided along with a second sample and hold capacitor C1. These may be capacitance components and/or an intrinsic capacitance.

If the pixel is not desired to be light sensitive (e.g., part of automatic exposure control) then the TGAB (Anti Blooming) signal is high causing the third transfer gate transistor M5 to connect the photodiode direct to an anti-blooming conductor VRTRST and any unwanted photo-generated charge is passed to this conductor. TGAB is held at an intermediate level (between ground and VRTRST) (diode saturation potential+transistor M5 threshold voltage), so that if "extreme" light falls on the pixel and the diode is at or near saturation, M5 starts to turn on and further photo-generated charge is then "dumped" into VRTRST rather than into the pixel and/or neighboring pixels.

During normal operation, the photodiode is reset by taking signals RESET, SW1, SW2, TG1 and TG2 high. Then signals TG1 and TG2 are taken low, so the Sample/Hold capacitors C1, C2 are reset and then signals SW1, SW2 are taken low followed by RESET.

The photodiode will integrate charge for a period of TA1 and this will be transferred to the second S/H capacitor C1 by pulsing the signal TG1 high. The photodiode will integrate charge for a period of TB1 and then this charge will be transferred to the first S/H capacitor C2 by pulsing TG2 high.

The pulses for TG1 and TG2 will be synchronous to the transmission data and so there will be a difference in charge on C1 with respect to C2 dependent on the transmitted data (either a "0" or a "1"). This integration and pulsing of TG1 and TG2 may be repeated several times to increase the total integration time for each phase. As compared to the arrangement of FIG. 3, this technique allows for the signal data to be sampled multiple of times per bit period. This allows for a low-data rate signal to be transmitted/received without perceived flicker by a human observer.

Figure 6:
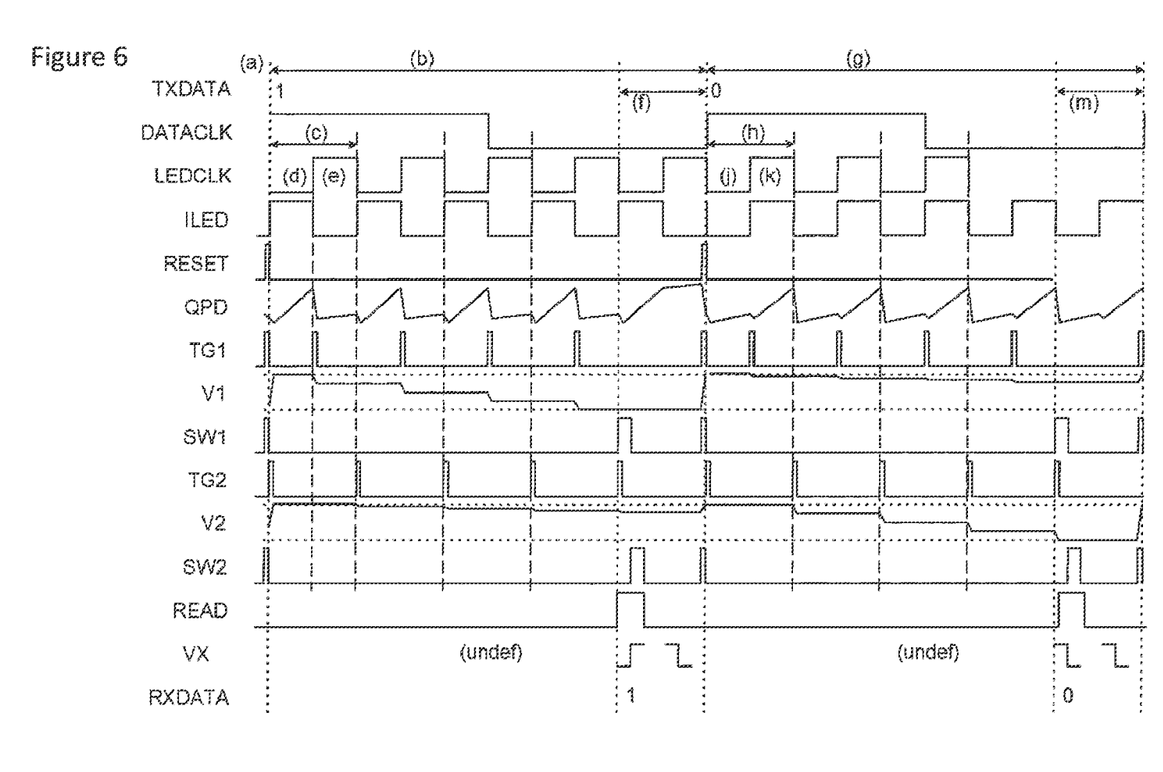
FIG. 6 shows a timing diagram for the second receiver.

Reference is made to FIG. 6 which shows a timing diagram for the circuit of FIG. 5. This exemplifies the method of the embodiments of FIG. 5. In the Figure, the LED pulsing frequency is higher than the data transmission frequency. This enables a low data-rate (for better SNR signal to noise ratio) but still have a higher illumination pulse frequency to avoid it flickering for a human observer. Note that the line "QPD" represents the photo-generated charge stored in the pinned photodiode.

The basic pattern is a multiple of LED pulses of the same bit, followed by a period where the signal from each pixel of an array is read out and the data decoded. ILED is the current through the LED. LEDCLK is the clock signal used to control when the LED is on or off. The LED is of course at the transmitting side and the photodiode at the receiver side.

Period (a)—This is the readout and reset phase of the data transmitted before that shown in FIG. 6. The readout part is not shown here (it will be described later in relation to period "(f)"). The reset pail of this period sees the RESET line active high initially and simultaneously the signals SW1, TG1, SW2 and TG2 may be active high at the same time as the reset line RESET. This causes the photodiode PD to be reset and also the sample and hold storage elements C1 and C2 are reset.

Period (b) is the transmission of a single bit (per transmission element). In some embodiments where there is more than one transmission element, different emitters may be transmitting different bits of information. In the example shown in FIG. 6, at the start of this period, the data to be transmitted is a "1".

Period (c) is a single LEDCLK cycle.

Period (d) is the first phase of the first LEDCLK cycle and in this example, the modulation scheme has this coded as LED on for the first half of the LEDCLK cycle and LED off for the second half of the LEDCLK cycle. At the start of this phase, TG2 is pulsed and any residual charge in the photodiode is transferred to the storage element C2. As the LED is on during this phase, their photons produce charge in the photodiode and so QPD increases. Any ambient photons also create charge in the photodiode.

Period (e) is the second phase of the first LEDCLK cycle and the LED is off. At the receiver, only ambient light impinges on the pixel, so the amount of charge generated is much less, i.e. QPD increases much more slowly. At the start of this phase, TG1 is pulsed and charge collected during the previous (i.e., "(d)") phase is transferred onto the storage element C1. As the LED was on during "(d)," a large number (e.g., 100-10,000) of electrons will have been collected in the photodiode and so this charge will cause the voltage on the storage element to drop. If the storage element is 20 fF and 2000 electrons have been collected, then the voltage V1 will drop by 1.6 mV (2000*1.6 E-16/20 E-15). However, the LED is off during period "(e)" and so there is little photo charge collected—just that from ambient light.

This operation is repeated several times. In this example, four complete LED pulses are sensed. It can be seen in FIG. 6, that the voltage V1 reduces by a "large" amount (16 mV in this example) each LEDCLK cycle whereas the voltage V2 reduces by a very small amount—depending on the ambient light.

Period (f) is the reset and readout period.

Typically, the light source is still producing LED pulses. Although these photons are collected by the diode, they are not used—the photodiode is reset just before the start of the next data phase (g). During period (f) the whole of the sensor array is read out.

Depending on the readout speed of the sensor, it may take several LEDCLK periods to readout the whole of the sensor), but this example assumes that the whole of the array can be readout in one LEDCLK period.

When the sensor is ready to readout out the signal from this row of pixels, then READ for this row will go active (high) and shortly afterwards one of the SW signals (SW1 in this example, but could be SW2 instead) goes high and the voltage on the corresponding storage element will be output from the pixel using the pixel's source follower transistor M1 and read switch M10. This voltage will appear on the bit line conductor "VX" for this column. SW1 will go low and then SW2 will go high so the voltage from the other storage element (C2) will be output onto VX.

In this example, as the LED was on for the period of time when the charge was transferred onto C1, the output voltage on VX will be lower when SW1 is active than the voltage when SW2 is active. This can be used to determine that a logical "1" was being transmitted. READ line for this row of pixels is de-activated.

After this row of pixels has been readout, this sequence is repeated for other rows of the sensor where the READ, SW1 and SW2 lines of subsequent rows are pulsed. FIG. 6 shows that the pixel on this column, but of a subsequent row outputs a "0".

At the end of this readout part of this period, the photodiodes and storage elements are reset as the signals RESET, SW1, TG1, SW2, TG2 are all high.

Period (g) is the transmission of the next single bit of information. At the start of this period, the data to be transmitted is a "0".

Period (h) is similar to "(c)" and "(j)" corresponds to "(d)", but as the data to be transmitted is "0", then the LED is low for the period (j) and high for the period (k).

The operation of the sensor is similar to the previous bit period, but now as the phase of the LED pulse is different, photo-charge is collected during a different period and so the voltage on C2 decays at a much faster rate than that of C1.

Period (m) is the readout period and as C2 has decayed faster than C1, C1 is a higher voltage and so the when it is readout onto the VX line, the VX is higher during the period when SW1 is active compared to when SW2 is active.

All of the rows of the sensor may be read out. In some embodiments, in previous images, the system has determined which parts of the image contains pixels which are flashing and conveying data, so only this "region of interest" need be readout. By reducing the number of rows readout, the time period can be reduced, reducing the number of wasted photons from the emitter. The pixels which are not being used may have TGAB high.

The pixel shown in FIG. 5 may provide an effective means to detect the data on a modulated light source.

Figure 7:
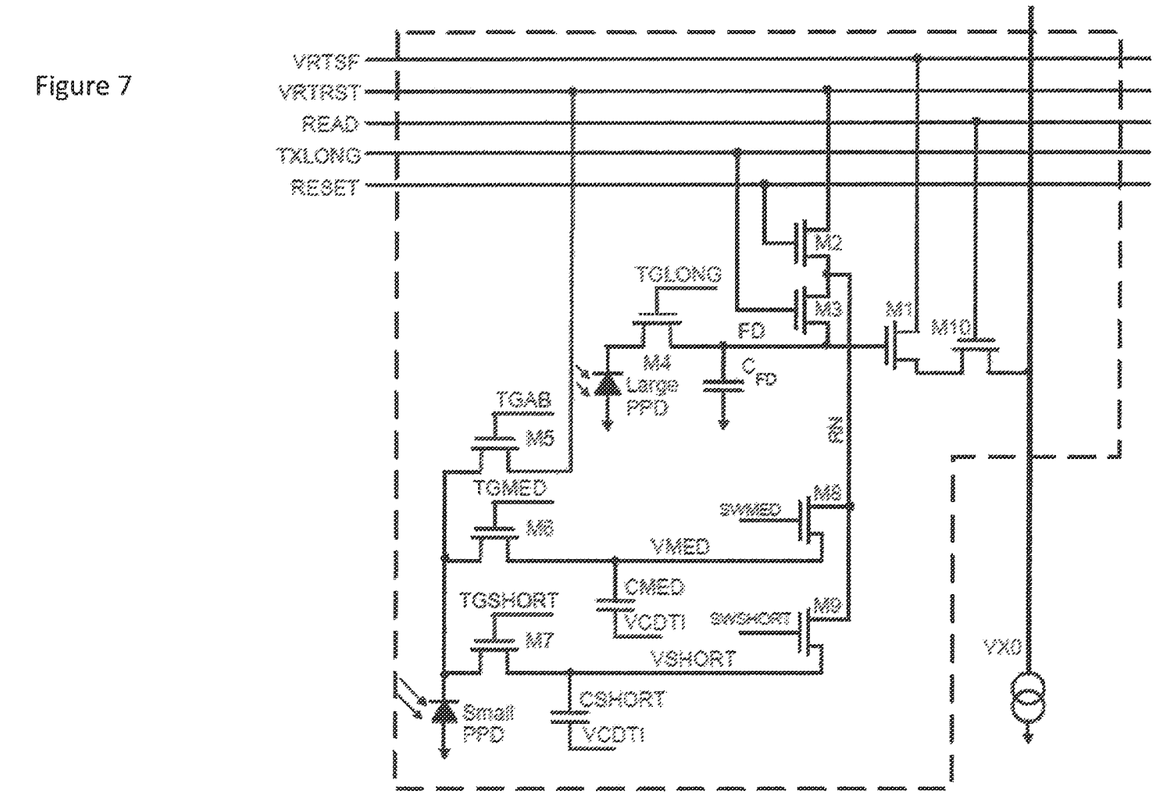
FIG. 7 shows a third receiver.

Reference is made to FIG. 7 which shows a pixel which may be suitable for providing an image to either a human or a machine vision based driving system. This modifies the pixel of FIG. 5 such that a 4T imaging pixel is additionally provided as well as the chopping pixel. The chopping pixel part operates as previously described to detect any pulsating light source.

In some embodiments, this pixel may be used to detect flicker from a LED (or other) pulsed illumination and use the information (both spatial and temporal) to convey information to the automotive driving system.

In some embodiments, this pixel/timing may be used in a separate camera—i.e. one camera is used in a flicker rejection mode (e.g. to monitor vehicle movement) and a separate camera (with the same pixel structure) is used with different timing in data communication mode to gather data from vehicles, street signs, "smart" illumination etc.

In some embodiments, a single camera may be used for both functions, i.e. for one (or more) frames, the camera is in flicker rejection mode and occasionally (e.g. every alternate frame, one frame in 10 or one frame in 100) change the operating mode to detect flicker/data.

This ratio between imaging mode and data mode may be pre-determined and fixed (e.g., 10 imaging: 1 data) or it may vary. For example, the ratio may be 100 {imaging}: 1 {data} and if there is no data source detected in the image, the system would stay in this ratio, but if there was a light source which transmitted data compatible with this system, then the ratio could change to a ratio e.g. 2 imaging frames then 1 data communication frame such that data is reliably received and then change back to the high imaging: communication data ratio as appropriate.

Embodiments may be used in a number of different applications or scenarios. By way of example only, some example applications or scenarios will now be described.

Traffic lights and signs using VLC (visible light communication to give information to vehicles.

Vehicle to vehicle communications, for example:

When to stop (vehicle is about to brake—communicates to vehicles behind);

Speed information; and

Destination and route information (vehicles that are travelling along same route can drive together in convoy).

Vehicle combines with one or more of GPS, camera and speed information to determine if stopping is required/safe.

New speed limits/change of speed limits/current speed limit.

Warning of traffic light change, e.g. preignition of vehicle stop/start mechanism for a green light; braking for a change to amber/red light.

Warning of traffic conditions;

Warning of road conditions;

Warning of weather conditions;

Traffic flow management.—warn vehicle's navigation computer about delays ahead so they can re-route. Or even instruct vehicle's navigation computer to take different route.

Improved ETA (estimated time of arrival) accuracy if delays are known.

Advertising of upcoming shops/restaurants. For example, the billboard tells user, pulsed light pops up notification or speaks notification of special offer or the like.

Local radio station frequency information—including which station is broadcasting traffic information.

Distance, to next petrol or charging station and occupancy level of charging level and/or price of petrol.

Vehicle occupancy level—in-vehicle detectors detects number of occupants and signals this information to monitoring systems to gain access to high occupancy vehicle lane (e.g. roadside camera interrogates vehicle to see if it has required number of occupants, if vehicle reports no, then can take picture of vehicle and send ticket).

Replacement for RF transmitter: for automatic toll collection. Current RF is short range, so vehicle needs to stop/slow down. In contrast with some embodiments, communication can be done hundreds of meters away, so vehicle need not slow down.

Toll booth can read many vehicles and redirect vehicle into appropriate lane/booth. If payment has not been accepted, then toll can instruct vehicle to go to alternative lane.

Faster border control—User's passport(s) can be scanned locally in vehicle by RFID reader and this information transmitted to border control via this method. Vehicle can be allowed to pass at high speed or re-directed to human check.

Fast food drive through:

Transmission of order;

Transmission of credit card RF ID information;

Reception of info telling user where (which bay, window) to collect "meal".

Parking Payment

Anywhere that credit card RF ID information can be transmitted, but over longer range and more reliability.

Non-automotive:

Virtual or augmented Reality headset-utilizing directionality of VLC allows different data sources to be selected—e.g., camera mounted on goggles and merely by moving head and looking at object/building/store, it is possible to connect directly to object's server and receive data such as building's history (architect, notable occupants, etc.) store's opening times, special offers etc.—directly from the store and not having to go via third party's server or internet.

Peer-2-peer communication, e.g., payments—imaging mode sees face, does face detection, recognizes trusted partner and then enables communication. If there are steerable emitters (e.g., LED/VCSEL array), then as the location of the desired recipient is now known, can use information from imaging mode to control the directionality of the transmitters. As the location of trusted partner is known, from face-recognition in imaging mode, this can be used by same array in communication mode to select data received only from a desired party and not from a third party. Having the same camera module (optics, silicon) for both imaging and communications means that there is not parallax problem (unlike two separate detectors—located differently will have different fields of view).

Similarly in AR/VR, the user can move their head so that part of the scene from the sensor is aligned with a predetermined position in their display to enable communication.

In some embodiments, the device of embodiments is configured to have a dual mode: an imaging mode and a communication mode such as described previously. Imaging modes are general known. This may be achieved temporally {for example n frame communications, m frames imaging} n and m are integers and may have any suitable values. Alternatively or additionally, this may be achieved spatially, {x row communications, y rows imaging}. This may permit accurate data fusion. This may involve gathering not just information such as shape, color, brightness and/or the like of an object, but also transmit data from a known object. This may be controlled by the processor.

Some embodiments may use spatial information (e.g., where object is located) to perform region of interest on the communication. The analysis as to where the object providing the encoded signals may be performed by the processor. This may reduce data rate, reduce effect of ambient (e.g., not try to readout data from sunlight), and/or increase SNR (less ambient photons). Pixels which are not required for receiving the encoded data may be switched off, put in a low power mode and/or used for imaging.

Having same camera module for imaging and communications removes alignment/parallax problems as compared to if two separate sensors are used.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. An apparatus comprising:
a pixel array having a plurality of photosensitive detectors, a first subset of the plurality of photosensitive detectors configured to capture an image of a light source, a second subset of the plurality of photosensitive detectors configured to capture data from an encoded pulsed light signal of the light source; and
processing circuitry configured to process data captured by pixels of the pixel array to provide image information and to detect data on an encoded pulsed light signal, processing circuitry configured to process data by:
sampling the light source at a first ratio corresponding to a sampling rate of the image to a sampling rate of the encoded pulsed light signal; and
detecting a data source in the light source, and based thereon, sampling the light source at a second ratio, the sampling rate of the encoded pulsed light signal in accordance with the second ratio being greater than the sampling rate of the encoded pulsed light signal in accordance with the first ratio.

2. The apparatus as claimed in claim 1, wherein the pixel array comprises a first part that is configured to provide image data to the processing circuitry and a second part that is configured to detect data on the encoded pulsed light signal.

3. The apparatus as claimed in claim 2, wherein the apparatus is configured to capture the image data for n frames and the encoded pulsed light signal for m frames, where n and m are integers.

4. The apparatus as claimed in claim 3 wherein when the processing circuitry is configured to determine when a pulsed encoded light signal is present and to determine when the pulsed encoded light signal is present to cause the value of m to be increased.

5. The apparatus as claimed in claim 1, wherein the pixel array is configured to capture the data providing the image information at different times to the data on the encoded pulsed light signal.

6. The apparatus as claimed in claim 1, wherein the processing circuitry is configured to use the image information to locate a position of a source of the encoded pulsed light signal.

7. The apparatus as claimed in claim 1, wherein a timing, associated with a respective pixel in the pixel array, controls if the respective pixel is configured to detect image data or data on the encoded pulsed light signal.

8. The apparatus as claimed in claim 1, wherein the processing circuitry is configured to provide an output to an automotive driving system.

9. The apparatus as claimed in claim 1, wherein each value of data on the encoded pulsed light signal is represented by a plurality of bit values.

10. The apparatus as claimed in claim 9, wherein the data is encoded on the encoded pulsed light signal using Manchester encoding.

11. The apparatus as claimed in claim 9, wherein each pixel further comprises a plurality of photodetectors, one photodetector dedicated for each of the plurality of bit values.

12. The apparatus as claimed in claim 9, wherein each pixel comprises a single photodetector controlled to detect each of the plurality of bit values.

13. The apparatus as claimed in claim 1, wherein the encoded pulsed light signal is at a frequency such that a pulsing of the encoded pulsed light signal is not detected by the human eye.

14. A method comprising:
sampling a light source at a first ratio, the first ratio corresponding to a sampling rate of an image of the light source to a sampling rate of an encoded pulsed light signal of the light source;
detecting a data source in the light source, and based thereon, sampling the light source at a second ratio, the sampling rate of the encoded pulsed light signal in accordance with the second ratio being greater than the sampling rate of the encoded pulsed light signal in accordance with the first ratio; and
processing data captured by a pixel array having a plurality of photosensitive detectors to provide image information and detect data on an encoded pulsed light signal, based on the sampling.

15. A method comprising:
capturing, by a vehicle, information from a light source using a pixel array having a plurality of photosensitive detectors, a first subset of the plurality of photosensitive detectors configured to capture an image of a light source, a second subset of the plurality of photosensitive detectors configured to capture an encoded pulsed light signal of the light source;
sampling the light source at a first ratio corresponding to a sampling rate of the image to a sampling rate of the encoded pulsed light signal;

detecting a data source in the light source, and based thereon, sampling the light source at a second ratio, the sampling rate of the encoded pulsed light signal in accordance with the second ratio being greater than the sampling rate of the encoded pulsed light signal in accordance with the first ratio;

determining image data from the image of the light source;

extracting an encoded pulsed light signal from the encoded pulsed light signal of the light source; and determining information for the vehicle based on the encoded pulsed light signal.

16. The method as claimed in claim 15, wherein the encoded pulsed light signal is at a frequency such that a pulsing of the encoded pulsed light signal is not detected by the human eye.

17. The method as claimed in claim 16, wherein the information from the light source is received at the pixel array from an illuminated sign.

18. The method as claimed in claim 15, wherein the information from the light source is received from a matrix of illumination sources.

19. The method as claimed in claim 15, further comprising optically transmitting information from the vehicle.

20. The method as claimed in claim 19, wherein the transmitted information comprises an actual speed of the vehicle, information related to acceleration/deceleration, information related to lane movement, a destination of the vehicle, whether the vehicle is in self-driving mode, whether the vehicle is in assisted mode or whether the vehicle is in fully manual mode.

21. The method as claimed in claim 15, wherein capturing data comprises capturing image data and the encoded pulsed light signal, wherein the image data is captured for n frames and the encoded pulsed light signal is captured for m frames, where n and m are integers.

22. The method as claimed in claim 15, wherein capturing data comprises capturing the image data at different times than capturing the encoded pulsed light signal.

23. The method as claimed in claim 15, further comprising using the image data to locate a position of a source of the encoded pulsed light signal.

24. The method as claimed in claim 15, wherein a timing, associated with a respective pixel in the pixel array, controls whether the respective pixel is configured to detect image data or data on the encoded pulsed light signal.

25. The method as claimed in claim 15, wherein each value of data on the encoded pulsed light signal is represented by a plurality of bit values.

26. The method as claimed in claim 25, wherein data is encoded on the encoded pulsed light signal using Manchester encoding.

* * * * *